(12) United States Patent
Liu

(10) Patent No.: US 11,830,498 B2
(45) Date of Patent: Nov. 28, 2023

(54) VOICE RECOGNITION SYSTEM AND VOICE RECOGNITION METHOD

(71) Applicant: Wistron Corp., New Taipei (TW)

(72) Inventor: Zheng-De Liu, New Taipei (TW)

(73) Assignee: Wistron Corp., New Taipei (TW)

( * ) Notice: Subject to any disclaimer, the term of this patent is extended or adjusted under 35 U.S.C. 154(b) by 142 days.

(21) Appl. No.: 17/400,071

(22) Filed: Aug. 11, 2021

(65) Prior Publication Data

US 2022/0319521 A1 Oct. 6, 2022

(30) Foreign Application Priority Data

Mar. 30, 2021 (TW) .................................. 110111471

(51) Int. Cl.
| | | |
|---|---|---|
| G10L 15/26 | (2006.01) | |
| G06N 3/08 | (2023.01) | |
| G10L 15/05 | (2013.01) | |
| G06V 10/75 | (2022.01) | |

(52) U.S. Cl.
CPC .............. G10L 15/26 (2013.01); G06N 3/08 (2013.01); G06V 10/751 (2022.01); G10L 15/05 (2013.01)

(58) Field of Classification Search
CPC ......... G10L 15/26; G10L 15/04; G10L 15/05; G10L 25/30; G10L 17/18; G10L 15/197; G10L 17/12; G10L 17/10
See application file for complete search history.

(56) References Cited

U.S. PATENT DOCUMENTS

| | | | | |
|---|---|---|---|---|
| 7,440,895 | B1 * | 10/2008 | Miller ................... | G10L 15/063 704/270 |
| 8,543,393 | B2 * | 9/2013 | Barnish ................... | G10L 15/05 704/251 |
| 10,319,366 | B2 * | 6/2019 | Lev-Tov ................. | G10L 15/01 |
| 10,657,952 | B2 * | 5/2020 | Hofer ...................... | G10L 15/16 |
| 10,854,190 | B1 * | 12/2020 | Szentes ................. | G06F 40/268 |
| 2002/0138265 | A1 * | 9/2002 | Stevens ................... | G10L 15/22 704/E15.04 |
| 2005/0203751 | A1 * | 9/2005 | Stevens ................... | G10L 15/22 704/E15.04 |
| 2009/0292538 | A1 * | 11/2009 | Barnish .................. | G10L 15/01 704/232 |
| 2018/0166069 | A1 * | 6/2018 | Chien ................... | G10L 15/063 |
| 2019/0043476 | A1 * | 2/2019 | Hofer ...................... | G10L 25/87 |

FOREIGN PATENT DOCUMENTS

| | | |
|---|---|---|
| CN | 1530926 A | 9/2004 |
| CN | 104899190 A | 9/2015 |
| CN | 103971675 B | 3/2016 |
| CN | 106486114 A | 3/2017 |

* cited by examiner

Primary Examiner — Vijay B Chawan

(57) ABSTRACT

A voice recognition method includes the following steps. An audio and a correct result are received. The audio is recognized, and a text file corresponding to the audio is output. The word error rate is determined by comparing the text file to the correct result. The word error rate is adjusted according to the weight of at least one important word, in order to calculate a professional score that corresponds to the text file. A determination is made as to whether the professional score is higher than a score threshold. In response to the professional score is higher than the score threshold, the text file, the audio, or the correct result corresponding to the professional score is sent to an engine training module for training.

19 Claims, 6 Drawing Sheets

VOICE RECOGNITION SYSTEM AND VOICE RECOGNITION METHOD

CROSS REFERENCE TO RELATED APPLICATIONS

This Application claims priority of Taiwan Patent Application No. 110111471, filed on Mar. 30, 2021, the entirety of which is incorporated by reference herein.

BACKGROUND OF THE INVENTION

Field of the Invention

The present disclosure relates to a recognition system, in particular, to a voice recognition device method and a voice recognition device.

Description of the Related Art

Nursing staff in hospitals and clinics need to record the conditions of many patients every day. A voice recognition system can be applied to this task, allowing the nursing staff to use a voice recognition application through a mobile phone that can input text by speaking.

However, the current state of voice recognition technology still produces voice recognition errors due to inaccurate pronunciation or the nursing staff speaking too fast. At this time, the nursing staff needs to manually modify the incorrectly recognized text, which is an inconvenience.

Therefore, how to recognize voices more accurately and find important keywords to improve the accuracy of voice recognition has become one of the problems that need to be improved in this field.

BRIEF SUMMARY OF THE INVENTION

In accordance with one feature of the present invention, the present disclosure provides a voice recognition system that includes a processor, a collection module, and a storage device. The collection module is configured to receive an audio and a correct result. The processor is configured to access programs stored in the storage device to implement an identification module, a comparison module, a scoring module, a determination module, and an engine training module. The recognition module is configured to recognize the audio and output a text file corresponding to the audio. The comparison module is configured to generate a word error rate by comparing the text file with the correct result. The scoring module is configured to adjust the word error rate according to the weight of at least one important word to calculate a professional score that corresponds to the text file. The determination module is configured to determine whether the professional score is higher than a score threshold. In response to the determination module determining that the professional score is higher than the score threshold, the processor sends the text file, the audio, or the correct result corresponding to the professional score to the engine training module for training.

In accordance with one feature of the present invention, the present disclosure provides a voice recognition method. The voice recognition method includes: receiving an audio and a correct result; recognizing the audio and outputting a text file corresponding to the audio; generating a word error rate by comparing the text file with the correct result; adjusting the word error rate according to the weight of at least one important word to calculate a professional score that corresponds to the text file; and determining whether the professional score is higher than a score threshold. In response to determining that the professional score is higher than the score threshold, the text file, the audio, or the correct result corresponding to the professional score is sent to an engine training module for training.

In accordance with one feature of the present invention, the present disclosure provides a voice recognition system that includes a processor and a storage device. The processor is used to receive an audio, a correct result and a text file, and access the program stored in the storage device to implement a comparison module, a scoring module, a determination module, and an engine training module. The comparison module is configured to generate a word error rate by comparing the text file with the correct result. The scoring module is configured to adjust the word error rate according to the weight of at least one important word to calculate a professional score that corresponds to the text file. The determination module is configured to determine whether the professional score is higher than a score threshold. In response to the determination module determining that the professional score is higher than the score threshold, the processor sends the text file, the audio, or the correct result corresponding to the professional score to the engine training module for training.

The voice recognition system and voice recognition method shown in the embodiment of the present invention can execute an application through a local host (such as a hospital server) or another electronic device (such as the mobile phone of a medical employee) to input voice and convert it into a text file. Automatically obtain important words in the text file, and automatically assign high weight to important words, which can save time and manpower in selecting important words in a large amount of corpuses (for example, hundreds of thousands of corpuses per month), and save on labor costs. In addition, as the corpus is constantly updated, high-weight words will become more and more accurate. Not only will important words be retrieved in an automated and accurate way, but also some important words that may not be noticed by humans may be obtained. Therefore, the recognition capabilities of the engine training module and the recognition module will become more and more accurate, achieving the effect of automatically and accurately recognizing audio or a large number of corpora.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
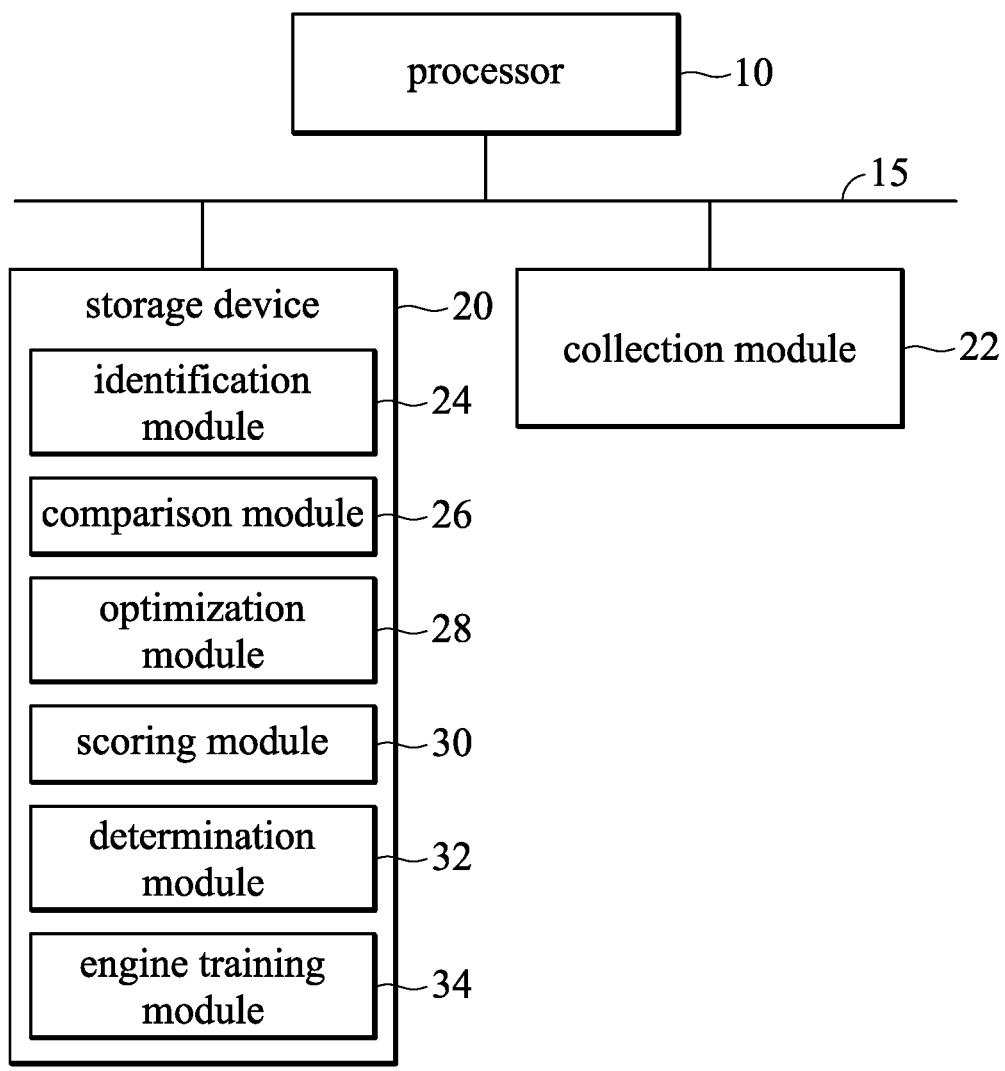
FIG. 1 is a block diagram of a voice recognition system in accordance with one embodiment of the present disclosure.
Figure 2:
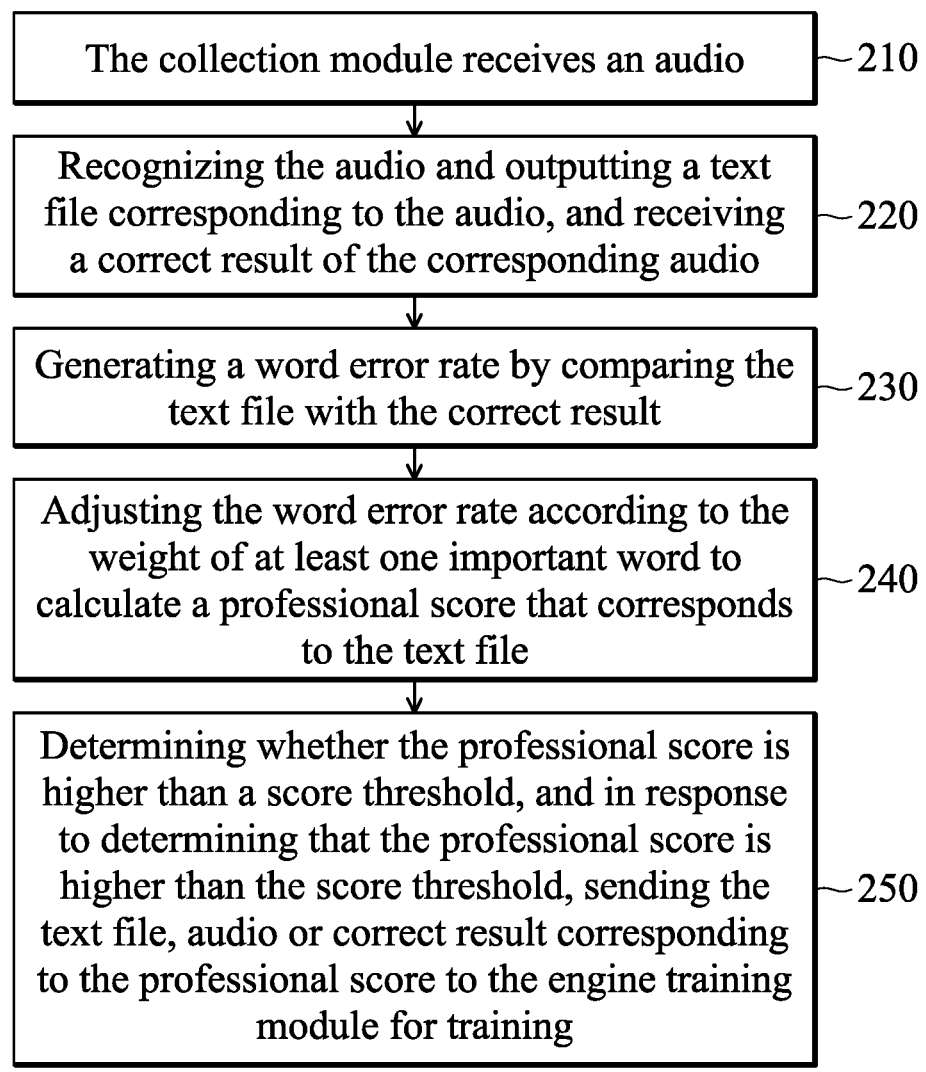
FIG. 2 is a flowchart of a voice recognition method in accordance with one embodiment of the present disclosure.

Please refer to FIGS. 1 to 2 together. FIG. 1 is a block diagram of a voice recognition system 100 in accordance with one embodiment of the present disclosure. FIG. 2 is a flowchart of a voice recognition method 200 in accordance with one embodiment of the present disclosure.

In one embodiment, as shown in FIG. 1, the voice recognition system 100 includes a processor 10, a collection module 22, and a storage device 20.

In one embodiment, the storage device 20 is electrically coupled to the processor 10 and a collection module 22 through a bus 15.

In one embodiment, the processor 10 can be composed of integrated circuits such as a micro controller, a microprocessor, a digital signal processor (DSP), and a Field Programmable Gate Array (FPGA), Application Specific Integrated Circuit (ASIC) or a logic circuit to implement.

In one embodiment, the storage device 20 can be implemented by a read-only memory, a flash memory, a floppy disk, a hard disk, a compact disk, a flash drive, a magnetic tape, a network accessible database, or a storage medium having the same function by those skilled in the art.

In one embodiment, the storage device 20 is used to store an identification module 24, a comparison module 26, an optimization module 28, a scoring module 30, a determination module 32, and an engine training module 34. These modules can be implemented by software, and this software can be executed by the processor 10. In one embodiment, the voice recognition system 100 can be implemented on a mobile phone, a tablet, a smart watch, a server, a notebook computer, or other electronic devices. These modules in the voice recognition system 100 can each correspond to a function in an application. For example, the voice recognition system 100 can be implemented by a mobile phone. There is an application in this mobile phone. When this application is triggered, the user can input audio into the mobile phone through the microphone of the mobile phone. After the mobile phone obtains the audio, these modules can perform voice recognition on the audio.

In one embodiment, the processor 10 is used to access programs stored in the storage device 20 to implement the identification module 24, the comparison module 26, the optimization module 28, the scoring module 30, and the determination module 32 and engine training module 34.

In one embodiment, the identification module 24, the comparison module 26, the optimization module 28, the scoring module 30, the comparison module 32, and the engine training module 34 may be implemented by circuits or chips, respectively. The group is located outside the storage device 20, and these modules are electrically coupled to the processor 10, respectively.

In one embodiment, the voice recognition system 100 can be applied in the field of medical environment, for example, the voice recognition system 100 is introduced in the field of a hospital. For example, an application can be installed on the mobile phone of the nursing staff, or the voice recognition system 100 be applied to the hospital server. After the nursing staff triggers the application, the voice recognition system 100 performs voice recognition to complete the nursing record, which can replace traditional handwriting. Nursing records can also be transmitted to the hospital server through the transmission interface of the mobile phone (such as Wi-Fi device, Bluetooth device), and the identification module 24, the comparison module 26, the optimization module 28, and the scoring module 30, the comparison module 32, and the engine training module 34 can be set in the hospital server, the hospital server stores or analyzes the received nursing records. In another embodiment, the collection module 22, the comparison module 26, the optimization module 28, the scoring module 30, the determination module 32, and the engine training module 34 are arranged in another server, and the identification module 24 is configured in the hospital server or the nursing staff's mobile phone. After the recognition module 24 performs voice recognition, it transmits the audio and recognition results to the collection module 22 in another server, so as to run the comparison module 26, the optimization module 28, and the scoring module 30, the determination module 32 and the engine training module 34 in another server.

In one embodiment, the engine training module 34 in the voice recognition system 100 can be installed on a hospital server. The hospital server can feed back hundreds of thousands of corpus to the voice recognition system 100 every month, so that the model used to recognize the voice in the hospital server is constantly updated, for example, the recognition module 24 is updated. In some embodiments, the known convolutional neural network (CNN) and the deep neural network of the loss function can be combined with the deep neural network-hidden markov model (DNN-HMM) to generate this model and then update the identification module 24. In another embodiment, the identification module 24 can be installed on a mobile device that is in communication with the hospital server. The hospital server sends back the parameters of the updated model after each update to the mobile phone to update the recognition module 24, thereby continuously optimizing the accuracy of voice recognition.

This is an example of the application of the voice recognition system 100, and this case is not limited to the application in the medical environment field. For example, a reporter recognizes the received voice as a text file through the voice recognition system 100, and/or a meeting recorder recognizes the received voice as a text file through the voice recognition system 100 . . . etc. The voice recognition system 100 can be used in any field where text files need to be recorded.

Next, referring to FIG. 2, the voice recognition method 200 is described below.

In step 210, the collection module 22 receives an audio.

In one embodiment, the collection module 22 can be a built-in microphone of the mobile phone, or can be a transmission interface or an input interface that includes a radio function. Any device that can receive audio and transmit it to the voice recognition system 100 can be implemented as the collection module 22. In another embodiment, the collection module 22 is installed in the server, and is used to receive audio and a correct result corresponding to the audio and the recognized text file.

In one embodiment, when a user (such as a medical staff) activates the voice recognition system 100 (such as opening an application on a mobile phone), the application will display the input of nursing records. At this time, the user can speak "Enter the hospital in a wheelchair . . . , end" to input audio. In another embodiment, the collection module 22 receives hundreds of thousands of corpus through a transmission interface or an input interface. These corpora include audio and the correct result corresponding to each audio. The correct result is the corresponding correct text file of each audio.

In step 220, the recognition module 24 recognizes the audio and outputs a text file corresponding to the audio, and the collection module 22 receives a correct result of the corresponding audio.

In one embodiment, when the user says "Enter the hospital in a wheelchair . . . , end", the audio is input, and the recognition module 24 recognizes the audio and outputs a text file corresponding to the audio. In some embodiments, when the voice recognition system 100 recognizes that the sentence ending is "end", the audio and the recognized text file are stored.

In step 230, the comparison module 26 generates a word error rate by comparing the text file with the correct result.

In one embodiment, the correct result is provided to the user. For example, the user can view the text file through the display interface (for example, the display screen of the mobile phone screen), and modify the text file through the input interface to generate the corresponding correct result, which is stored in the storage device 20, or transmitted to the collection module 22.

In one embodiment, when the text file contains at least one English word and at least one Chinese character, for example, the correct sentence is "今天 Paul 的血壓正常, 心情狀態很 happy". However, in the text file, it is recorded that "今天 Paul 的血壓真常, 心 (empty value) 狀態很 habit 皮 ,". Due to the sequential nature of Chinese, these two sentences are actually wrong in three places (The place that should be "正" is recognizable as "真", the word "情" is not recognized, so fill in the empty value, and "皮" is the extra word).

In this example, the comparison module 26 first replaces at least one English word ("Paul", "habit") and at least one punctuation mark (",") in the text file with empty values, which will become "今天 (empty value) 的血壓正常 (empty value), 心 (empty value) 狀態很 (empty value) 皮". Compare the remaining Chinese character with the Chinese character in the correct result, and compare all the correct number of characters ("今天的血 壓正常心情狀態很" is 12 words) minus the number of wrong words (the place that should be "正" in the text file is recognized as "真", and the word "情" is empty in the text file, which means it has not been recognized, so the number of wrong characters is 2), and then subtract the number of extra characters ("皮" is an extra character, so it is 1), and the result is the correct number of Chinese characters (12−2−1=9)), divide the correct number of Chinese characters (9) by the total number of Chinese characters in the correct result (12) to produce a Chinese correct rate (9/12=0.75, which is a 75% Chinese correct rate).

In one embodiment, when the text file includes at least one English word and at least one Chinese character, for example, the correct sentence that the user wants to input is "今天 Paul 的血壓正常, 心情狀態很 happy", but the text file records "今天 Paul 的血壓 真常, 心 (empty value) 狀態很 habit 皮 ,", since the English words are not sequenced after being disassembled, the comparison module 26 first removes at least one Chinese character in the text file (only "Paul" and "habit" are left), if there are punctuation marks also remove, compare at least one English word with the English words in the correct result ("Paul", "happy"), and subtract all the English words in the remaining correct results (2) minus missing or incorrect words ("habit" should be "happy", 1 word), and then subtract the number of extra words (in this example, there are no extra words, 0 words) to get the correct number of English words (2−1−0=1), divide the correct number of English words (1) by the total number of English words in the correct result (2) to generate an English correct rate (1/2=0.5, which is a 50% English correct rate).

In one embodiment, the comparison module 26 first reduces the number of words in the correct result "今天 Paul 的血壓正常, 心情狀態很 happy" (14 words) minus the number of differences in Chinese characters (3). After subtracting the number of English word differences (which is 1), the correct total number of words (14−3−1=10) is obtained. After that, divide the total number of correct words (10) by the number of all words in the correct result (10/14 about 71%) to generate a correct rate of the text file (about 71%). Use 100% to subtract the correct rate of the text file to be 71%, so as to get a word error rate of 29%.

In one embodiment, the correct rate of the text file of 71% can be regarded as the initial score of 71.

In one embodiment, the optimization module 28 creates a text optimization table and a number optimization table. Before calculating the word error rate, the optimization module 28 determines whether there are characters or numbers in the text file that meet the text optimization table or the number optimization table. In response to the text file including characters or numbers that match the text optimization table or the number optimization table, the optimization module 28 replaces the text or numbers in the text file according to the text optimization table or the number optimization table.

In one embodiment, refer to the recognition result, for example: "不行 (which means no in English)" or "步行 (which means walk in English)", the sounds pronounced by the user are the same in Chinese, but because the recognition module 24 makes a wrong judgment, there is a discrepancy with the correct text.

For example, the correct sentence is "入院方式是步行" (which means the way to enter the hospital is by walking in English), but the text file records "入院方式是不行" (which means the way to enter the hospital is not acceptable in English), such errors should not result in deductions for identification.

Therefore, the optimization module 28 creates a text optimization table and a number optimization table for this type of text, so that different users can maintain the error correction table by themselves, as shown in Table 1.

TABLE 1

| wrong text | correct text |
|---|---|
| 入院方式是不行 | 入院方式是步行 |
| 護理記錄 | 護理記錄 |

In one embodiment, when the recognition module 24 encounters the pronunciation of "步行" during voice recognition, it can check the maintenance error correction table and know that among the two words "不行" or "步行", users want to say "步行" are more likely, so they will replace "不行" with "步行" in the text file to reduce the error rate.

In one embodiment, for the identification of numbers, there will be differences between Chinese numbers and Arabic numbers. These two differences should not be regarded as different differences. Therefore, some processing needs to be done for this type of text, including the difference in pronunciation. Chinese can read "百 (hundreds)", "千 (thousands)", and "萬 (tens of thousands)", but the numbers will not come out, and the usual time is also the same, so this part will do the number substitution processing. For example, the correct sentence is "12:30", and "十二點半" "十二點三十分" or "十二點三十" outputted by the recognition module 24 is processed by number substitution, so it is regarded as the correct output.

In one embodiment, the optimization module 28 creates a text optimization table and a number optimization table, and replaces the text in the text optimization table and the numbers in the number optimization table before calculating the error rate.

In one embodiment, the optimization module 28 first creates a text optimization table and a number optimization table, and substitutes text and numbers for the text file through the recognition module 24 for optimization. The optimization module 28 then submits the optimized text file to the comparison module 26 to perform a series of calculations to calculate the initial score.

In step 240, the scoring module 30 adjusts the word error rate according to the weight of at least one important word to calculate a professional score that corresponds to the text file.

In the text file, it is necessary to be more accurate or closer to the score of the professional recognition application in order to more easily reflect the accuracy of the voice recognition system 100 in the professional application. Professional scores can be maintained manually or adjusted automatically. Manual maintenance, for example, is for medical staff to increase the weight of some medical keywords (such as GCS, Normal saline), add 0.5 more to the score, and also classify them into departments, such as nursing departments. For another example, increase the weight of more important medical keywords (such as blood pressure, body temperature), add one more point to the score, and classify them into departments, such as nursing departments. For the medical field, the part of the professional words that belong to it will be calculated as the weight plus of the overall profession, but the measured value for each department or application may be higher than the professional words or general words. Because such words need to be more accurately recognized, they are used as one of the criteria for scoring.

In one embodiment, the update weight module 44 multiplies the weights corresponding to the important words in the text files by the number of incorrect or correct words corresponding to the important words, so as to calculate a plurality of professional scores corresponding to the text files. For example, the English part of the correct sentence (after deducting punctuation and Chinese, so the sentence is not sequential) and the English text in the text file are:

"pressure heart and or nor temperature pressure nor"

"pressure or nor pressure and of".

Accordingly, the scoring module 30 can adjust the weights according to the weights in Table 2 below. The words not specifically listed in Table 2 are non-medical keywords, so there is no need to adjust the weights. In Table 2, the larger the weight, the more critical the word is. The comparison table of addition and subtraction based on the weight is shown in Table 3 below:

TABLE 2

| correct text | weight |
|---|---|
| pressure | 0.5 |
| heart | 0.5 |
| temperature | 1 |

TABLE 3

| number of occurrences of correct results | number of occurrences in text file | number of errors | extra points (multiply the number of errors or correct times by the weights in Table 2) |
|---|---|---|---|
| pressure*2 | pressure*2 | 0 | 2(0.5) = 1 |
| heart*1 | | −1 | −1(0.5) = −0.5 |
| and*1 | and*1 | 0 | |
| or*1 | or*1 | 0 | |
| nor*2 | nor*1 | −1 | |
| temperature*1 | | −1 | −1(1) = −1 |
| | of*1 | +1 | |

In Table 3, although "nor" and "of" are misinterpreted, these two words are not medical keywords in Table 2, so there is no need to adjust the weights. In the number of errors column in Table 3, "−1" represents the number of wrong words, and "+1" represents the number of extra words. From Table 2 and Table 3, the initial score and the correct rate of professional recognition can be calculated. The formulas are as follows:

Correct rate=([all words of correct results]−[wrong words]−[extra words])/[all words of correct results]

Initial score=correct rate*100 (round it to the nearest whole number).

Take Table 2 and Table 3 as examples:

Initial correct rate=(8−3−1)/8=0.5

Initial score=0.5*100=50 points

[Professional recognition correct rate]=([number of all words of correct results]−[number of wrong words]−[number of extra words]+[number of professional correct words*weight]−[number of professional wrong words*weight])/[all words of the correct result]

[Professional rating]=[professional recognition correct rate]*100

Take Table 2 and Table 3 as examples:

Professional recognition accuracy=[(8−3−1)+ (2*0.5)−(1*0.5)−(1*1)]/8=3.5/8=0.4375

Professional score=0.4375*100=44 points (rounded up)

In this way, the initial score and the initial correct rate, the professional score and the correct rate of professional recognition can be obtained. It can be seen that the medical-related word errors in the text file will deduct a higher score based on the weight, resulting in a decline in the professional score, while the unimportant words have relatively little impact.

In addition, the voice recognition system 100 can also automatically filter out important medical-related words, which will be explained in conjunction with the flowchart in FIG. 4 later.

In step 250, the determination module 32 determines whether the professional score is higher than a score threshold (for example, 85 points by default), and in response to the determination module 32 determine that the professional score (for example, 90 points) is higher than the score threshold, the processor 10 sends the text file, audio or correct result corresponding to the professional score to the engine training module 34 for training.

In one embodiment, the engine training module 34 can apply a known deep neural network of convolutional neural network (CNN) to process words and loss functions in combination with a hidden Markov model (DNN-HMM) to process audio files.

In one embodiment, since the engine training module 34 only receives the text files corresponding to higher than the scoring threshold, it means that these text files have a high degree of accuracy and can be used as the corpus for the training model. After these text files are input to the engine training module 34, the engine training module 34 generates an updated model, and then sends the parameters of the updated model to the identification module 24, thereby improving the identification rate of the identification module 24 in a rolling manner.

Figure 3:
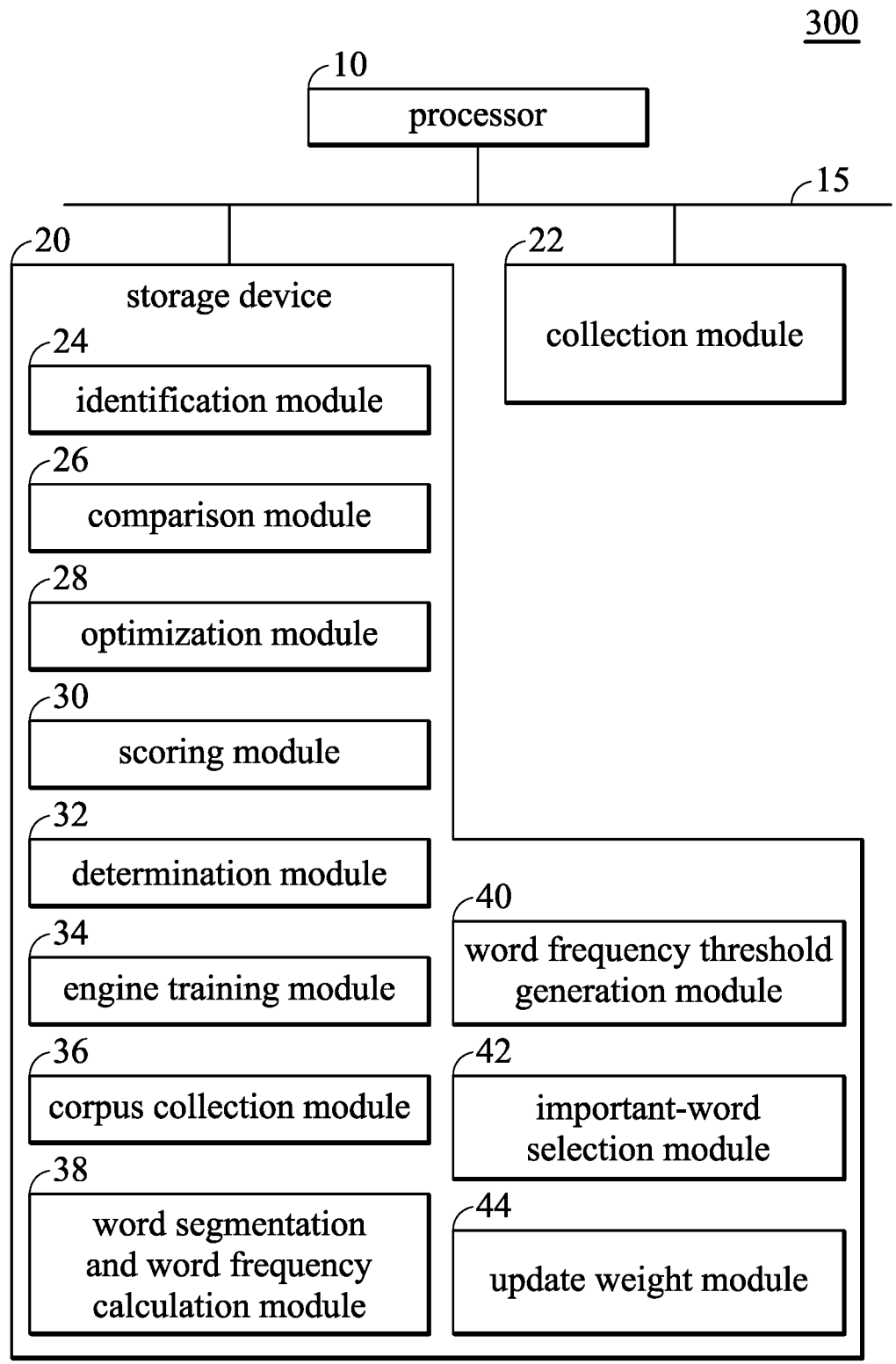
FIG. 3 is a block diagram of a voice recognition system 300 in accordance with one embodiment of the present disclosure.
Figure 4:
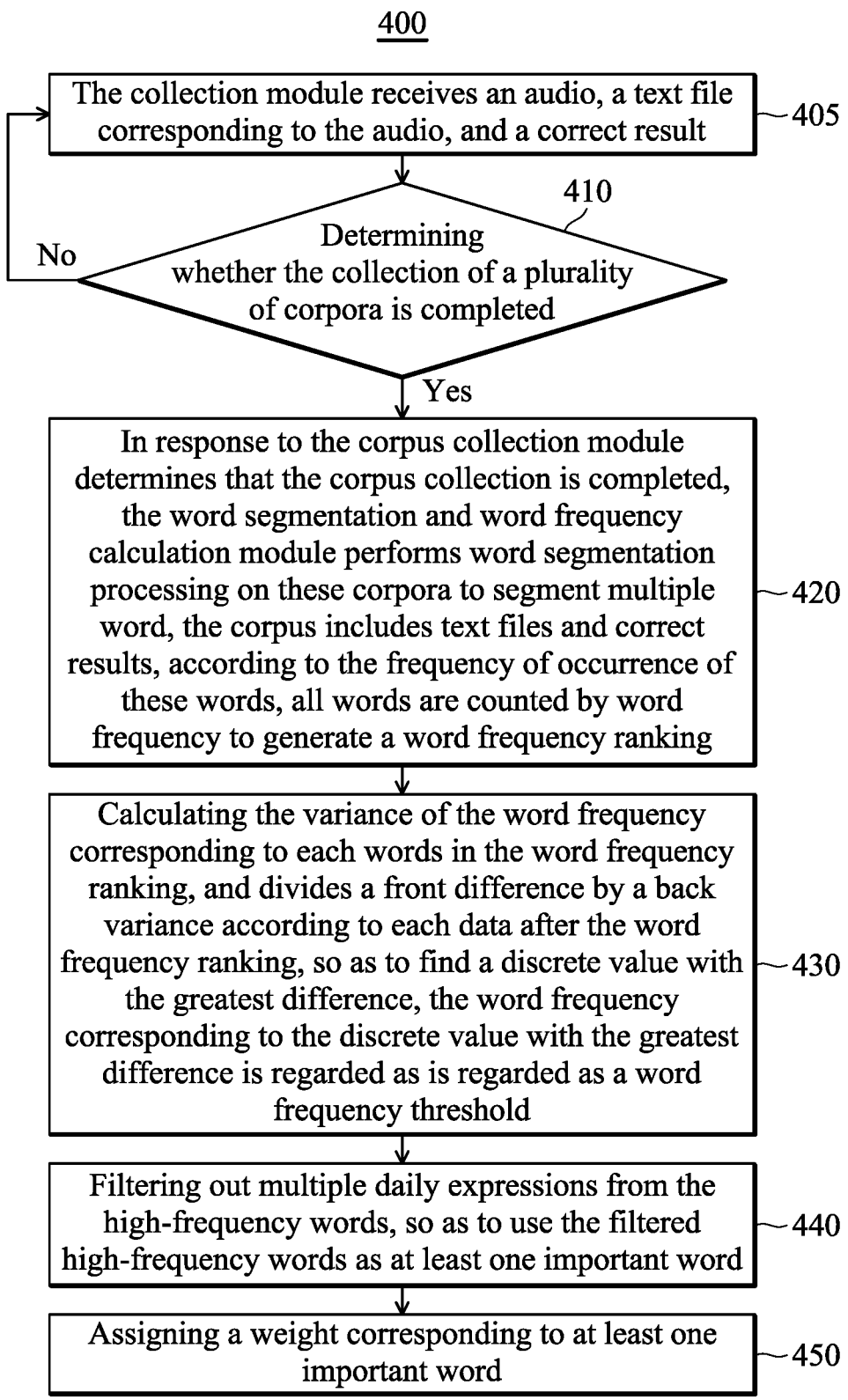
FIG. 4 is a flowchart of a voice recognition method 400 in accordance with one embodiment of the present disclosure.

Next, please refer to FIGS. 3 to 4 together. FIG. 3 is a block diagram of a voice recognition system 300 in accordance with one embodiment of the present disclosure. FIG. 4 is a flowchart of a voice recognition method 400 in accordance with one embodiment of the present disclosure.

In one embodiment, as shown in FIG. 3, the voice recognition system 300 further includes a corpus collection module 36, a word segmentation and word frequency calculation module 38, a word frequency threshold generation module 40, and an important-word selection module 42 and an update weight module 44. In one embodiment, the storage device 20 is used to store a corpus collection module 36, a word segmentation and word frequency calculation module 38, a word frequency threshold generation module 40, an important-word selection module 42 and an update weight module 44. These modules can be implemented by software, and this software can be executed by the processor 10.

In one embodiment, the processor 10 is used to access programs stored in the storage device 20 to implement the corpus collection module 36, the word segmentation and word frequency calculation module 38, the word frequency threshold generation module 40, and important-word selection module 42 and the update weight module 44.

In one embodiment, the corpus collection module 36, the word segmentation and word frequency calculation module 38, the word frequency threshold generation module 40, the important-word selection module 42 and the update weight module 44 can be implemented by a circuit or a chip, these modules are located outside the storage device 20, and these modules are electrically coupled to the processor 10, respectively.

Next, referring to FIG. 4, the voice recognition method 400 is described below. In one embodiment, the voice recognition method 400 can be combined with the voice recognition method 200 to achieve the effect of accurately recognizing professional and important words.

In step 405, the collection module 22 receives an audio, a text file corresponding to the audio, and a correct result.

In step 410, the corpus collection module 36 is used to determine whether the collection of a plurality of corpora is completed.

In one embodiment, the server of the hospital sends about 100,000 corpus produced by nursing staff every month to provide the voice recognition system 300 for corpus cleaning. The corpus contains revised sentences and unmodified sentences and audio files. This is set to complete the collection for one month, and the number of corpora is sufficient for use. Therefore, the corpus collection module 36 can determine that the collection of the corpus is completed when the corpus reaches 100,000 in one month. Among them, "100,000 pens in one month" is only an example, and the voice recognition system 300 can set a determination method for determining whether the corpus is collected according to different application scenarios.

When the corpus collection module 36 determines that the collection of multiple corpora is completed, step 420 is performed. When the corpus collection module 36 determines that the collection of multiple corpora has not been completed, it returns to step 405 to continue collecting corpora.

In step 420, in response to the corpus collection module 36 determines that the corpus collection is completed, the word segmentation and word frequency calculation module 38 performs word segmentation processing on these corpora to segment multiple words. The corpus includes text files and correct results. According to the frequency of occurrence of these words, all words are counted by word frequency to generate a word frequency ranking.

In one embodiment, the word frequency ranking is used to indicate the frequency of occurrence of each of these words, and the ranking order of the words is sorted according to the frequency of occurrence of the words from high to low.

In one embodiment, the frequency of occurrence of each of these words is called a word frequency.

For example, after the voice recognition system 300 receives enough corpus, the word segmentation and word frequency calculation module 38 performs word analysis. Word analysis includes pre-processing and word segmentation processing. The pre-processing is to remove the punctuation marks and numbers of the sentences and convert them into spaces, and the fragments of each sentence are taken out in Chinese and English respectively for word segmentation. Segmentation is the splitting of a sentence into several words. English is based on a single word as a unit. Chinese is based on a single word as a unit, divided into two characters, three characters, four characters, etc. For example, the sentence is: "新增護理紀 錄，痰音無法自咳" in Chinese (which means "adding nursing records, sputum sounds cannot cough by itself" in English), if every two characters are used as a unit of phrase, it will be generated: "新增", "增護", "護理", "理紀", "紀錄", "痰音", "音無", "無法", "法自", "自咳" and other words. Similarly, using every three characters as a phrase unit and every four characters as a word segmentation unit is also processed in a similar way.

After the word segmentation is processed, the word segmentation and word frequency calculation module 38 will perform word frequency statistics on all the words, and the word frequency represents the frequency of occurrence of the words. In one embodiment, the word segmentation and word frequency calculation module 38 will be presented in a sorting manner. Generally, the more important words will appear in the front, the less important words will appear in the back, and the latter are almost all non-nouns. For example, in the case of two-character segmentation, the word number 1 is "patient", there are 49,105 occurrences in 2,608,195 segmentation of words. In the case of two-character segmentation, the word number 2 is "use", there are 25,746 occurrences in 2,608,195 segmentation of words. In the case of two-character segmentation, the word number 2 is "evaluation", there are 21,369 occurrences in 2,608,195 segmentation of words.

In one embodiment, the word segmentation and word frequency calculation module 38 presents the word segmentation in a descending order of word frequency. For example, when the word segmentation is two characters, the first to the twelfth segmentation of words in order are "病人" (which means patient in English), "使用" (which means using in English), "評估" (which means assessment in English), "估病" (which means estimating disease in English), "定時" (which means timing in English), "呼吸" (which means breathing in English), "頭痛" (which means headache in English), "衛教" (which means health education in English), "監測" (which means monitoring in English), "靜脈" (which means venous in English), "給予" (which means giving in English) and "情形" (which means situation in English), it can be seen that the commonly used words will appear in the front, and the less frequently used words will appear in the back.

In step 430, the word frequency threshold generation module 40 calculates the variance of the word frequency corresponding to each words in the word frequency ranking, and divides a front difference by a back variance according to each data after the word frequency ranking, so as to find a discrete value with the greatest difference, the word frequency corresponding to the discrete value with the greatest difference is regarded as a word frequency threshold. In one embodiment, the calculation of the front difference and the back variance of the word frequency threshold generation module 40 refers to: the front difference is to calculate the variance of the previous data of the current data; the back variance is to calculate the variance of the data behind the current data.

In one embodiment, the word frequency threshold generation module 40 defines the words corresponding to the word frequencies higher than the word frequency threshold as a multiple high-frequency words, and the words lower than the word frequency threshold words are defined as multiple low-frequency words.

Figure 5:
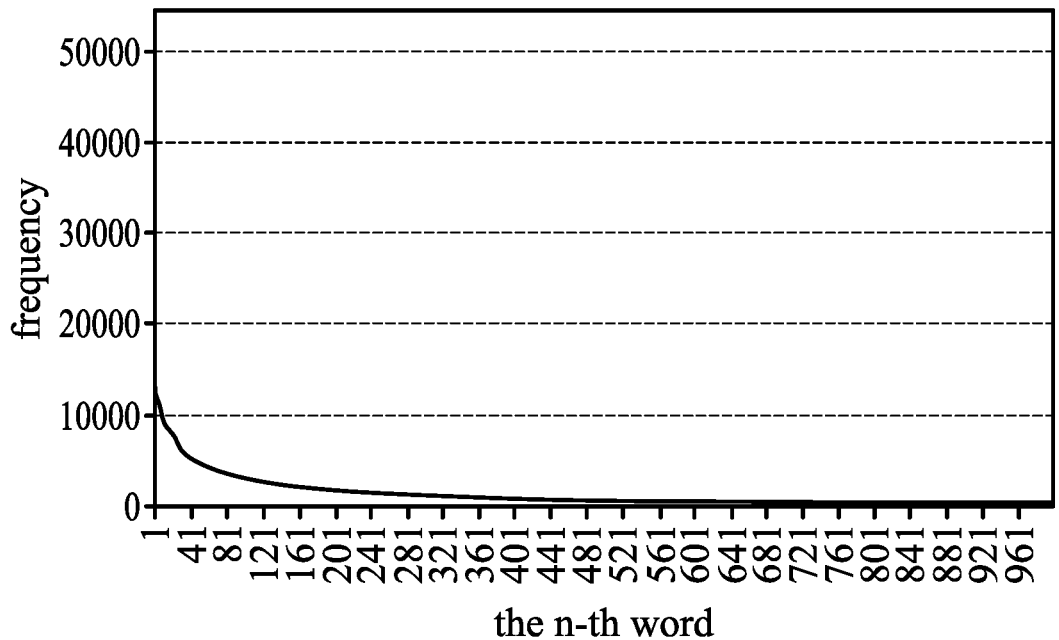
FIG. 5 is a schematic diagram illustrating a word frequency distribution in accordance with one embodiment of the present disclosure.
Figure 6:
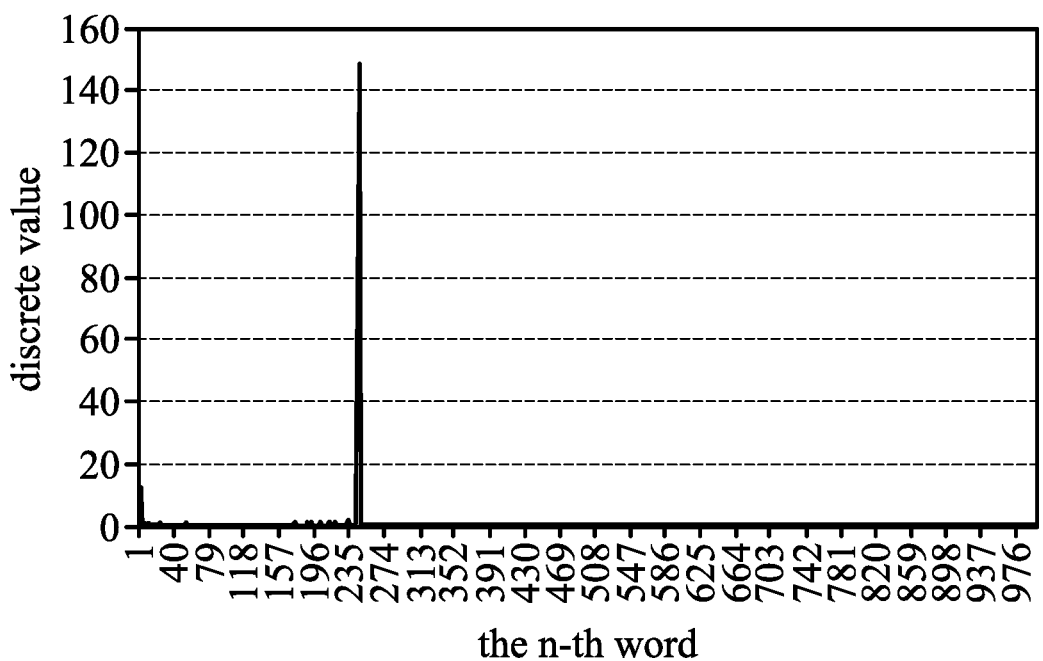
FIG. 6 is a schematic diagram of a word frequency threshold in accordance with one embodiment of the present disclosure.

Please refer to FIGS. 5-6. FIG. 5 is a schematic diagram illustrating a word frequency distribution in accordance with one embodiment of the present disclosure. FIG. 6 is a schematic diagram of a word frequency threshold in accordance with one embodiment of the present disclosure. FIG. 5 shows the frequency of the first 1,000 words. The X axis represents the n-th word, and n is a positive integer. For example, when n is 41, it represents the 41st word, and the Y axis represents the frequency. FIG. 6 shows the discrete value of the first 1,000 words. The X axis represents the n-th word, and n is a positive integer. For example, when n is 41, it represents the 41st word, and the Y axis represents the discrete value.

In one embodiment, the word frequency threshold generation module 40 uses the word frequency threshold to distinguish between high word frequency and low word frequency. For example, the word frequency threshold generation module 40 calculates the variance of each of these word frequencies in FIG. 5. The word frequency threshold generation module 40 divides a front difference by a back variance according to the order of word frequencies to find a discrete value of the greatest difference, and regards the word frequency corresponding to the discrete value with the greatest difference as a word frequency threshold. As shown in FIG. 6, each point in FIG. 6 is the front difference divided by the back variance, and the highest point corresponds to the 245th word, then the word frequency of the 245th word is the word frequency threshold of these corpuses. Therefore, every time the corpus is imported and the word frequency is counted, the old corpus word frequency will be integrated, and the word frequency threshold will be dynamically updated. In other words, the first word to the 245th word sorted by word frequency from high to low are regarded as high word frequency, and the words after the 245th word are all low word frequency.

In step 440, the important word module 42 is selected to filter out multiple daily expressions from the high-frequency words, so as to use the filtered high-frequency words as at least one important word.

Through the aforementioned step 430, high-frequency words can be obtained, but not all high-frequency words are medical-related words. These high-frequency words will be mixed with some daily nouns, such as: today, us, help, etc.

Daily expressions do not need to be classified as high-weight scoring. Therefore, the important-word selection module 42 is configured to use non-medical corpus to assist in finding daily expressions. For example, important-word selection module 42 uses news corpus (or book corpus) to extract 500 non-medical related articles, like the aforementioned step 420, the high word frequency method is used to find high-frequency words. Then the important-word selection module 42 subtracts the high-frequency words from the medical corpus from the high-frequency words from the news corpus, and what remains are the important medical-related words, as shown in Table 4.

TABLE 4

| High-frequency of medical-related words | High-frequency repetition of news corpus |
|---|---|
| patient | |
| assessment | V |
| timing | V |
| monitor | V |
| vein | |
| give | V |
| situation | V |
| assist | V |
| skin | |
| family members | V |
| doctor's order | |
| surroundings | V |
| danger | V |
| drug | |
| redness | |

In this example, in the column of the high-frequency repetition of news corpus in Table 4, these important words that are not checked are the important medical-related words that should be given high weight.

In step 450, the update weight module 44 assigns a weight corresponding to at least one important word.

In one embodiment, the important medical-related words determined by the important-word selection module 42 (step 440) can be listed in Table 4. Therefore, the update weight module 44 automatically assigns preset weights corresponding to each of these important medical-related words, for example, as shown in Table 5.

TABLE 5

| High-frequency of medical-related words | High-frequency repetition of news corpus | weight |
|---|---|---|
| patient | | 2 |
| assessment | V | 1 |
| timing | V | 1 |
| monitor | V | 1 |
| vein | | 2 |
| give | V | 1 |
| situation | V | 1 |
| assist | V | 1 |
| skin | | 2 |
| family members | V | 1 |
| doctor's order | | 2 |
| surroundings | V | 1 |
| danger | V | 1 |
| drug | | 2 |
| redness | | 2 |

In other words, the update weight module 44 increases the weight of important medical-related words, and other important non-medical-related words are regarded as general daily terms.

In one embodiment, the weights corresponding to these important words are higher than the weights corresponding to the low-frequency words and the weights corresponding to daily terms.

In one embodiment, the update weight module 44 multiplies the weights corresponding to the important words in the text files by the number of incorrect or correct words corresponding to the important words, so as to calculate a plurality of professional scores corresponding to the text files.

In one embodiment, the scoring module 30 sends these professional scores to the determination module 32. The determination module 32 regards the corpus corresponding to those professional scores higher than the score threshold (for example, 85 points) as multiple high-quality corpora, and sends these high-quality corpora and the corresponding audio to the engine training module 34. The engine training module 34 trains through these high-quality corpora. The engine training module 34 generates an updated model after finishing the training. The engine training module 34 uses the updated model as the identification module 24.

In one embodiment, the scoring threshold is a preset value.

In one embodiment, the determination module 32 selects the corpus that requires text optimization or number optimization from the corpus corresponding to those whose professional scores are less than or equal to the score threshold. The determination module 32 transmits these corpora to the optimization module 28 to update the text optimization table and the number optimization table. The corpus that requires text optimization or number optimization can be selected manually, or the determination module 32 can be selected according to a rule (for example, selecting those professional scores greater than an adjustment threshold, or the occurrence frequency of words is higher than a word frequency threshold) to make a selection.

In one embodiment, commands and corresponding command corpus are designed for the departments of the hospital, such as internal medicine, surgery, obstetrics and pediatrics, etc., and user training is performed. When producing professional scores, the corpus with high professional scores is optimized for the recognition engine and processed for the subject of the corpus.

In one embodiment, the engine training module 34 and the recognition module 24 apply the known CNN to process words, and use the DNN-HMM of the loss function to process the audio files. In one embodiment, the engine training module 34 and the recognition module 24 can design commands and corresponding command corpus for hospital departments, such as internal medicine, surgery, obstetrics and pediatrics, and perform user training. When producing professional scores, aiming at the subjects of the corpus, let the corpus with high professional scores optimize the process of engine training, and increase the recognition rate of the engine training module 34 and the recognition module 24.

Figure 7:
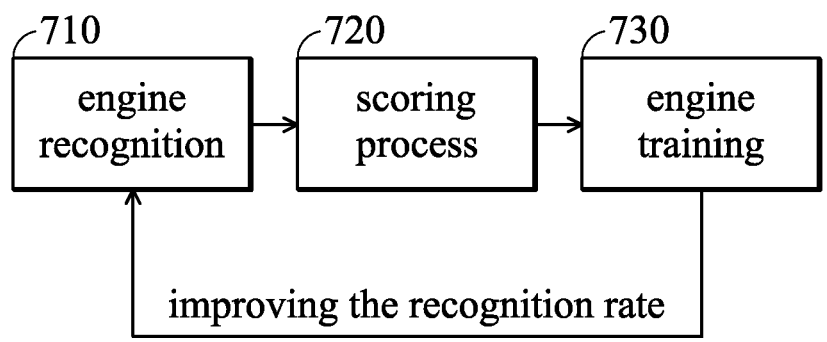
FIG. 7 is a schematic diagram illustrating a rolling learning method in accordance with one embodiment of the present disclosure.

As shown in FIG. 7, FIG. 7 is a schematic diagram illustrating a rolling learning method in accordance with one embodiment of the present disclosure. The rolling learning method is to calculate the professionally scored corpus (that is, the scoring process 720, corresponding to step 240 in FIG. 2 and/or step 450 in FIG. 4), regard corpus with scores of 85 or more than 90 as high-quality corpus, and input high-quality corpus into engine training module 34 for training. Because these corpus are more high-quality and accurate than the corpus that the general user feedbacks.

The rolling learning method will send these high-quality corpora to the engine training module 34 for engine training 730, thereby increasing the sensitivity of the engine training module 34 to professional corpus and improving the recognition rate of important words.

The engine training module 34 generates an updated model after finishing the training. The engine training module 34 can transmit the parameters in the updated model to the recognition module 24 to update the parameters in the recognition module 24, and then allow the updated recognition module 24 to perform engine recognition 710 on the new corpus. The engine recognition 710 at this time can recognize the new corpus more accurately.

Therefore, by filtering out the corpus with high professional score, the system can make the engine training 730 achieve the effect of improving the recognition rate, and send the training results back to the engine recognition 710, so that as soon as the new corpus enters the recognition module 24. The recognition rate of engine recognition 710 for new corpus is also improved. This method reduces a large amount of manpower, and uses a rolling learning method to achieve an automated corpus learning mechanism.

The voice recognition system and voice recognition method shown in the embodiment of the present invention can execute an application through a local host (such as a hospital server) or other electronic devices (such as a mobile phone of a medical staff) to input voice and convert it into a text file. Automatically obtain important words in the text file, and automatically assign high weight to important words, which can save time and manpower in selecting important words in a large amount of corpuses (for example, hundreds of thousands of corpus per month), and achieve the effect of saving labor costs. In addition, as the corpus is constantly updated, high-weight words will become more and more accurate. Not only will important words be retrieved in an automated and accurate way, but also some important words that may not be noticed by humans may be obtained. Therefore, the recognition capabilities of the engine training module and the recognition module will become more and more accurate, achieving the effect of automatically and accurately recognizing audio or a large number of corpora.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A voice recognition system, comprising:
   a collection module, configured to receive an audio and a correct result; and
   a storage device; wherein the processor is configured to access programs stored in the storage device to implement an recognition module, a comparison module, a scoring module, a determination module, and an engine training module, wherein:
   the recognition module is configured to recognize the audio and output a text file corresponding to the audio;
   the comparison module is configured to generate a word error rate by comparing the text file with the correct result;
   the scoring module is configured to adjust the word error rate according to a weight of at least one important word to calculate a professional score that corresponds to the text file, wherein the important word is a keyword associated with a specific domain; and
   the determination module is configured to determine whether the professional score is higher than a score threshold;
   wherein, in response to the determination module determining that the professional score is higher than the score threshold, the processor sends the text file, the audio, or the correct result corresponding to the professional score to the engine training module for training.

2. The voice recognition system of claim 1, wherein the processor is further configured to access programs stored in the storage device to implement a word segmentation and word frequency calculation module and a word frequency threshold generation module, wherein:
   the word segmentation and word frequency calculation module performs word segmentation processing on a received corpus to segment a plurality of words, wherein the corpus includes the text file and the correct result, and a word frequency ranking is generated by processing a frequency calculation on all the words according to an occurrence frequency of all the words;
   the word frequency threshold generation module calculates a variance of the word frequency corresponding to each of the words in the word frequency ranking to find a discrete value with the greatest difference, and treats the word frequency corresponding to the discrete value with the greatest difference as a word frequency threshold;
   wherein the word frequency threshold generation module defines the words corresponding to the word frequencies higher than the word frequency threshold as a plurality of high-frequency words, and sets the words corresponding to the word frequencies lower than the word frequency threshold as a plurality of low-frequency words.

3. The voice recognition system of claim 2, further comprising:
   an important-word selection module, configured to filter out a plurality of daily expressions in the high-frequency words, and to use the filtered high-frequency words as the important word.

4. The voice recognition system of claim 3, further comprising:
   an update weight module, configured to assign the weight corresponding to the important word;
   wherein, the weight corresponding to the important word is higher than the weights corresponding to the low-frequency words and the weight corresponding to the daily expressions.

5. The voice recognition system of claim 4, wherein the update weight module calculates the professional scores corresponding to the text files by multiplying the weights corresponding to the important words in the text files by the number of incorrect or correct words corresponding to the important words.

6. The voice recognition system of claim 5, wherein the scoring module sends the professional scores to the determination module, the determination module regards the corpus corresponding to the professional score higher than the score threshold as a plurality of high-quality corpora, the determination module sends the audio, text files or correct results corresponding to the high-quality corpus to the engine training module, the engine training module uses the high-quality corpus for training, the engine training module generates an updated model after finishing training, and the engine training module regards the updated model as the recognition module; wherein the scoring threshold is a preset value.

7. The voice recognition system of claim 1, further comprising:
   an optimization module, configured to create a text optimization table and a number optimization table;

before calculating the word error rate, the optimization module determines whether there are characters or numbers in the text file that match the text optimization table or the number optimization table;

in response to the text file having characters or numbers that match the text optimization table or the number optimization table, the optimization module replaces the text or numbers in the text file according to the text optimization table or the number optimization table.

8. The voice recognition system of claim 1, wherein in response to the text file contains at least one English word, at least one Chinese character, and at least one punctuation mark, the comparison module replaces the English word and the punctuation mark in the text file with a null value, the remaining Chinese character is compared with the Chinese character in the correct result to obtain a correct number of Chinese characters, and the correct number of Chinese characters is divided by a total number of Chinese characters in the correct result to generate a Chinese correct rate.

9. The voice recognition system of claim 8, wherein in response to the text file comprises at least one English word and at least one Chinese character, the comparison module removes the Chinese character in the text file, and compares the English word in the text file with the English word in the correct result to obtain a correct number of English words, and the correct number of English words is divided by a number of all words of the English words in the correct result to generate an English correct rate;

wherein the comparison module subtracts a number of all the words in the correct result from a number of differences in Chinese characters, and then subtracts a number of differences in English words to obtain a correct total number of words, and divide the correct total number of words by the number of all the words in the correct result to generate a correct rate of the text file, and the correct rate of the text file is subtracted from 100% to get the word error rate.

10. A voice recognition method, comprising:

receiving an audio and a correct result;

recognizing the audio and outputting a text file corresponding to the audio;

generating a word error rate by comparing the text file with the correct result;

adjusting the word error rate according to a weight of at least one important word to calculate a professional score that corresponds to the text file, wherein the important word is a keyword associated with a specific domain; and determining whether the professional score is higher than a score threshold;

wherein the text file, the audio, or the correct result corresponding to the professional score is sent to an engine training module for training, in response to determining that the professional score is higher than the score threshold.

11. The voice recognition method of claim 10, further comprising:

processing word segmentation on the received corpus to segment a plurality of words, wherein the corpus includes the text file and the correct result, and generating a word frequency ranking by processing a frequency calculation on all the words according to occurrence frequency of all the words;

calculating a variance of the word frequency corresponding to each of the words in the word frequency ranking to find a discrete value with the greatest difference, and treating the word frequency corresponding to the discrete value with the greatest difference as a word frequency threshold;

wherein the words corresponding to the word frequencies higher than the word frequency threshold are defined as a plurality of high-frequency words, and the word frequencies lower than the word frequency threshold to correspond to the words is defined as a plurality of low-frequency words.

12. The voice recognition method of claim 11, further comprising:

filtering out a plurality of daily expressions in the high-frequency words, and using the filtered high-frequency words as the -important word.

13. The voice recognition method of claim 12, further comprising:

assigning the weight corresponding to the important word;

wherein the weight corresponding to the important word is higher than the weights corresponding to the low-frequency words and the weight corresponding to the daily expressions.

14. The voice recognition method of claim 13, further comprising:

calculating the professional scores corresponding to the text files by multiplying the weights corresponding to the important words in the text files by the number of incorrect or correct words corresponding to the important words.

15. The voice recognition method of claim 14, further comprising:

regarding the corpus corresponding to the professional score higher than the score threshold as a plurality of high-quality corpora;

sending the audio, text files or correct results corresponding to the high-quality corpus to the engine training module;

wherein the engine training module uses the high-quality corpus for training, the engine training module generates an updated model after finishing training, and the engine training module regards the updated model as a recognition module;

wherein the scoring threshold is a preset value.

16. The voice recognition method of claim 15, further comprising:

creating a text optimization table and a number optimization table; and before calculating the word error rate, determining whether there are characters or numbers in the text file that match the text optimization table or the number optimization table;

in response to the text file having characters or numbers that match the text optimization table or the number optimization table, replacing the text or numbers in the text file according to the text optimization table or the number optimization table.

17. The voice recognition method of claim 10, wherein in response to the text file comprises at least one English word and at least one Chinese character, the voice recognition method further comprises:

replacing the English word and at least one punctuation mark in the text file with a null value;

comparing the remaining Chinese character with the Chinese character in the correct result to obtain the correct number of Chinese characters; and dividing the correct number of Chinese characters by a total number of Chinese characters in the correct result to generate a Chinese correct rate.

18. The voice recognition method of claim 17, wherein in response to the text file contained at least one English word and at least one Chinese character, the voice recognition method further comprises:
    removing the at least one Chinese character in the text file;
    comparing the at least one English word with the English word in the correct result to obtain a correct number of English words;
    dividing the correct number of English words by a number of all words of the English words in the correct result to generate an English correct rate;
    subtracting a number of all the words in the correct result from a number of differences in Chinese words, and then subtracting a number of differences in English words to obtain a correct total number of words; and
    dividing the correct total number of words by the number of all the words in the correct result to generate a correct rate of the text file, and subtracting 100% from the correct rate of the text file to get the word error rate.

19. A voice recognition system, comprising:
    a processor, configured to receive an audio, a correct result, and a text file; and
    a storage device; wherein the processor is configured to access programs stored in the storage device to implement a comparison module, a scoring module, a determination module, and an engine training module, wherein:
    the comparison module is configured to generate a word error rate by comparing the text file with the correct result;
    the scoring module is configured to adjust the word error rate according to the weight of at least one important word to calculate a professional score that corresponds to the text file, wherein the important word is a keyword associated with a specific domain; and
    the determination module is configured to determine whether the professional score is higher than a score threshold;
    wherein, in response to the determination module determining that the professional score is higher than the score threshold, the processor sends the text file, the audio, or the correct result corresponding to the professional score to the engine training module for training.

* * * * *